(12) United States Patent
Hoisington

(10) Patent No.: US 8,141,815 B1
(45) Date of Patent: Mar. 27, 2012

(54) WING STRUT TRAILING EDGE DEVICE

(75) Inventor: Zachary Charles Hoisington, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 347 days.

(21) Appl. No.: 12/468,366

(22) Filed: May 19, 2009

(51) Int. Cl.
*B64C 3/18* (2006.01)
(52) U.S. Cl. .......................................... 244/37
(58) Field of Classification Search ............... 244/37, 244/87, 218, 219
See application file for complete search history.

(56) References Cited

OTHER PUBLICATIONS

Chambers, Joseph, Innovation in Flight—NASA SP-2005-4539, Aug. 22, 2005, pp. 227-246.*
Lyon, James and Wilde, Sarah, Design Project 2005/2006 Technical Report Group 5—The Strut Braced Wing Aircraft, Feb. 27, 2006, Sections 7.5 and 9.1.*
Website Address: http://www.airplane-pictures.net/images/uploaded-images/2007-7/5979.jpg as printed May 19, 2009; 1 page.
Website Address: http://www.oldprops.ukhome.net/HD34%20Photographs.htm as printed May 19, 2009; 1page.
Website Address: http://www.airliners.net/aviation-forums/tech_ops/read.main/130896 as printed May 19, 2009; 1 page.

* cited by examiner

*Primary Examiner* — Timothy D Collins
*Assistant Examiner* — Nicholas McFall
(74) *Attorney, Agent, or Firm* — Hope Baldauff Hartman, LLC

(57) ABSTRACT

Apparatus and methods provide for a wing strut having a trailing edge device that is selectively deployable to create aerodynamic lift. Aspects of the disclosure provide a wing strut that is attached to an aircraft fuselage at one end and the aircraft wing at the opposite end. A trailing edge device is attached to the trailing edge of the wing strut. According to various embodiments, the trailing edge device may taper from a maximum chord length at the fuselage, to a minimum chord length near the wing attachment location in order to minimize the effect of the strut on the airflow around the wing. For the same reason, one aspect provides for a change in camber of the wing strut and trailing edge device from a substantially symmetric airfoil at the fuselage to a negatively cambered airfoil near the wing.

17 Claims, 7 Drawing Sheets

WING STRUT TRAILING EDGE DEVICE

BACKGROUND

Improving flight efficiency is an ever-increasing focus for many airlines and other aircraft operators as fuel costs and operating budgets fluctuate. One aircraft characteristic that directly influences flight efficiency is wingspan. Typically, with other variables equalized, as wingspan increases, flight efficiency also increases. However, as the wingspan of an aircraft increases, the additional weight associated with the wing structure that is required to support the aircraft during flight. One solution to this excessive wing weight issue associated with aircraft having relatively long wingspans is to use a strut to brace the wing.

Using a strut to support an aircraft wing reduces the overall weight of the wing, and consequently of the aircraft, since the internal structure of the wing no longer bears the entire weight and lifting forces associated with the wing. However, the addition of a strut carries some penalties that adversely impact flight efficiency. One of those penalties includes drag. The use of any external aircraft structure that is exposed to the ambient airflow around the aircraft during flight creates an aerodynamic drag that decreases flight efficiency, which in turn increases fuel and other associated operating costs. Conventional wing struts do not provide any aerodynamic benefits that offset the aerodynamic penalties associated with the struts.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus and methods described herein provide for an aircraft having a wing strut that creates aerodynamic lift in addition to the structural benefits provided by the strut in order to improve the efficiency of the aircraft. According to one aspect, the wing strut has a trailing edge device attached to the trailing edge of the strut. The trailing edge device is deployable in a downward direction into the ambient airflow in order to increase the pressure differential between the lower air pressure on the top surface of the trailing edge device and strut and the higher air pressure on the bottom surface of the trailing edge device and strut to create aerodynamic lift.

According to another aspect, an aircraft includes a fuselage, a wing attached to a top portion of the fuselage, and a wing strut. The wing strut is attached at one end to a lower portion of the fuselage and at an opposite end to a lower side of the wing. The wing strut additionally includes a trailing edge device that is configured to deploy downward into the ambient airflow to create a deployed configuration, and to retract upward to a stowed configuration.

According to yet another aspect, a method is provided for creating aerodynamic lift with a wing strut. A flight event is detected, and in response, a trailing edge device attached to a trailing edge of the wing strut is deployed downward into the ambient airflow to create lift.

The features, functions, and advantages that have been discussed can be achieved independently in various embodiments of the present disclosure or may be combined in yet other embodiments, further details of which can be seen with reference to the following description and drawings.

DETAILED DESCRIPTION

The following detailed description is directed to a wing strut trailing edge device that selectively creates an aerodynamic lifting force on a wing strut during take-off, landing, and any other flight selected operations in order to increase the efficiency of the strut and consequently, the aircraft. As discussed above, wing struts may be effectively used to support aircraft wings to reduce the overall weight of the required wing structure. However, in doing so, the wing struts create additional drag that negatively impacts flight efficiency. Moreover, wing struts conventionally provide only structural benefits to the aircraft, and do not provide any aerodynamic benefits.

Utilizing the concepts and technologies described herein, a trailing edge device mounted to the trailing edge of a wing strut can be selectively deployed during various flight operations in order to create aerodynamic lift. According to various embodiments described below, the trailing edge device may be tapered and the strut inversely cambered near the junction of the strut and the wing so as to minimize any effect on the airflow around the aircraft wings. Using the embodiments described herein, wing struts may advantageously increase flight efficiency by not only allowing for an increased wing span with minimal weight penalties, but also by creating aerodynamic lift to assist the aircraft during low speed operations such as take off and landing operations, as well as during any other flight operation in which maximum lift creation is desirable.

Figure 1:
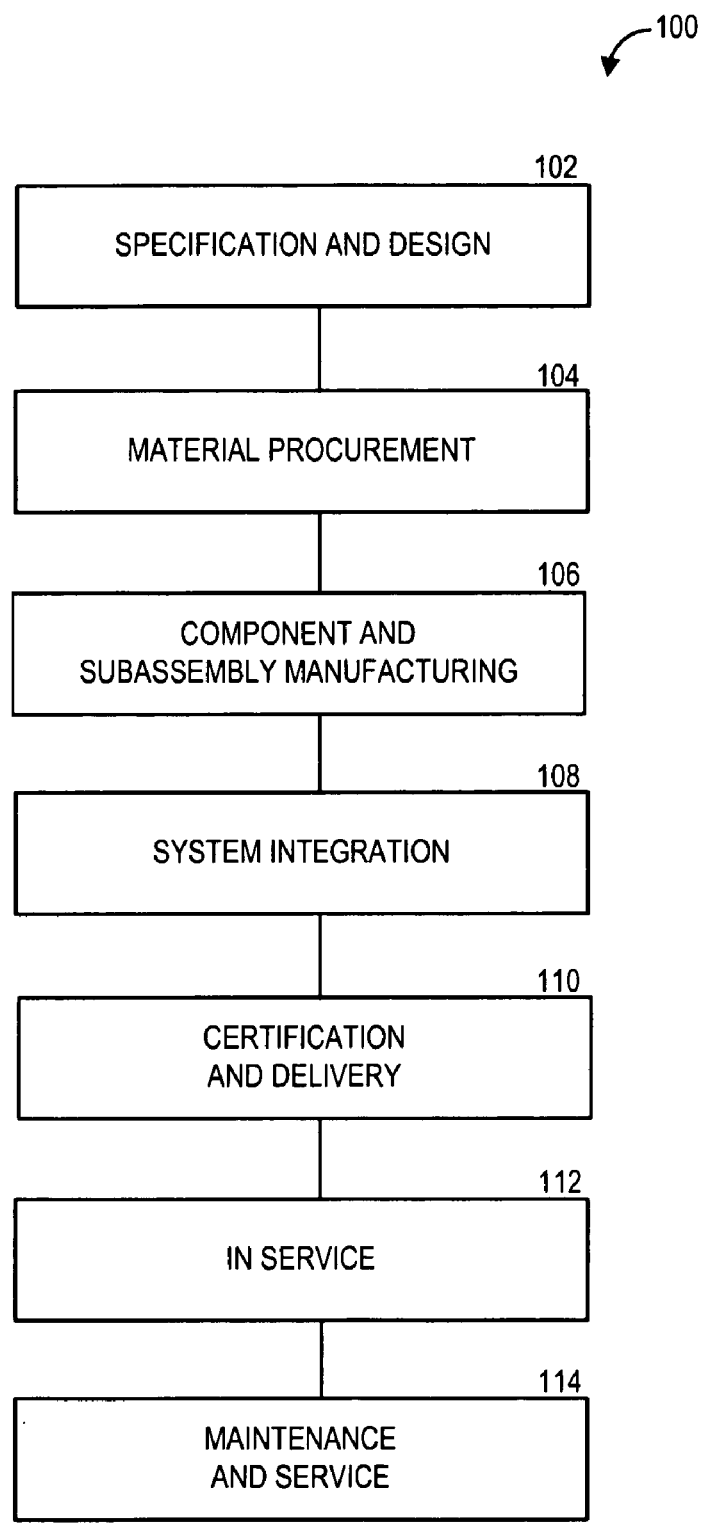
FIG. 1 is a flow diagram of aircraft production and service methodology.
Figure 2:
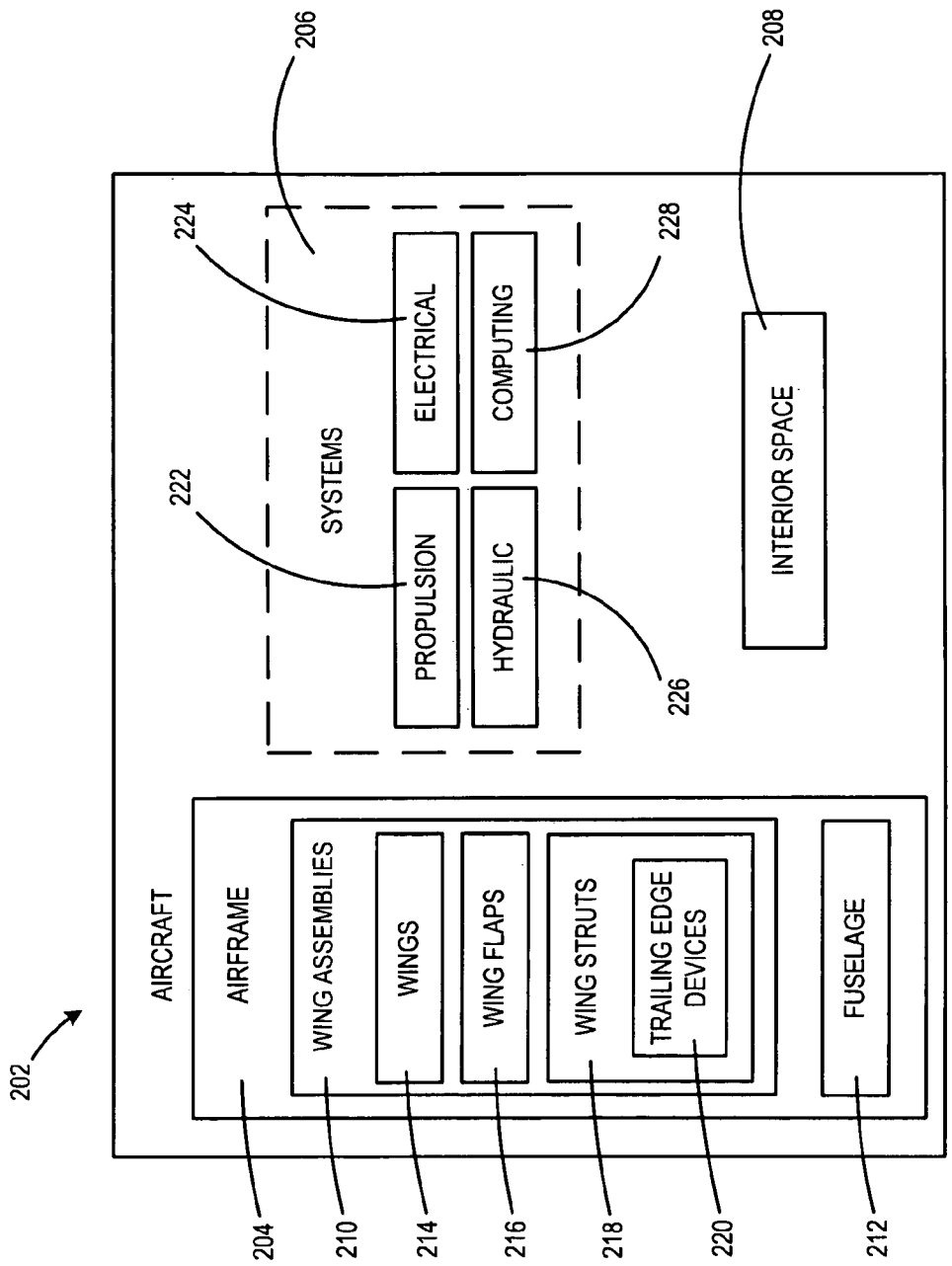
FIG. 2 is a block diagram of an aircraft according to various embodiments presented herein.

In the following detailed description, references are made to the accompanying drawings that form a part hereof, and which are shown by way of illustration, specific embodiments, or examples. Referring now to the drawings, in which like numerals represent like elements through the several figures, a wing strut trailing edge device according to the various embodiments will be described. Embodiments of the disclosure may be described in the context of an aircraft manufacturing and service routine 100 as shown in FIG. 1 and an aircraft 202 as shown in FIG. 2. During pre-production, exemplary routine 100 may include specification and design 102 of the aircraft 202 and material procurement 104. During production, component and subassembly manufacturing 106 and system integration 108 of the aircraft 202 takes place. Thereafter, the aircraft 202 may go through certification and delivery 110 in order to be placed in service 112. While in service by a customer, the aircraft 202 is scheduled for routine maintenance and service 114 (which may also include modification, reconfiguration, refurbishment, and other operations).

Each of the operations of routine 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and others.

Figure 3:
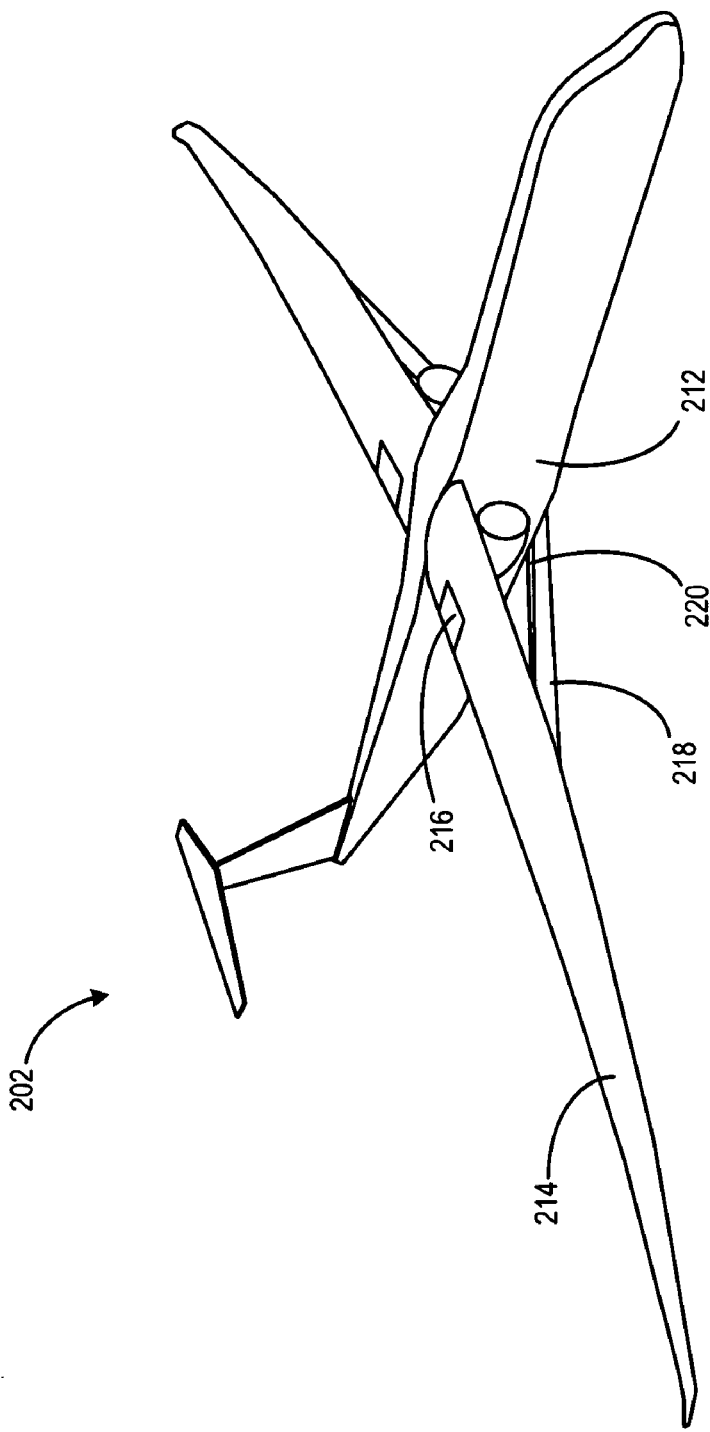
FIG. 3 is a top perspective view of an aircraft showing wing strut trailing edge device installed on an aircraft wing strut according to various embodiments presented herein.

FIG. 2 shows a simplified diagram of an aircraft 202 according to the embodiments described herein. FIG. 3 shows an illustrative example of the aircraft 202 according to various embodiments described herein. As seen in FIGS. 2 and 3, the aircraft 202 may include an airframe 204, a number of systems 206, and an interior space 208. The airframe 204 includes wing assemblies 210 and a fuselage 212. For the purposes of this disclosure, the wing assemblies include the wings 214, wing flaps 216, and wing struts 218. As will be described below with respect to the various embodiments, the wing struts 218 further include trailing edge devices 220 that may be rotated downward, or deployed, into the ambient airflow to create aerodynamic lift.

Examples of high-level systems 206 include, but are not limited to, a propulsion system 222, an electrical system 224, a hydraulic system 226, and a computing system 228. The computing system 228 may be functional to control the deployment and retraction of the trailing edge devices 220 and to control any of the other aircraft systems 206 in the manners described below.

It should be appreciated that the aircraft 202 shown in FIG. 3 is just one embodiment of an aircraft 202 utilizing aspects of this disclosure. The various concepts described herein are not limited to the particular design, configuration, components, features, and combination thereof shown in FIG. 3 and described within the illustrative examples given below. For example, the aircraft 202 may have any tail configuration, any number of engines mounted at any number of locations, and may even be configured as a low-wing aircraft wherein the wings 214 are mounted to a bottom portion of the fuselage 212 with the wing struts 218 attached at one end to a top portion of the fuselage 212 and at opposing ends to a top surface of the wings 214. The aerodynamic benefits provided by the trailing edge devices 220 described herein may benefit any aircraft 202 of any design and purpose in which the use of wing struts 218 is advantageous.

Figure 4:
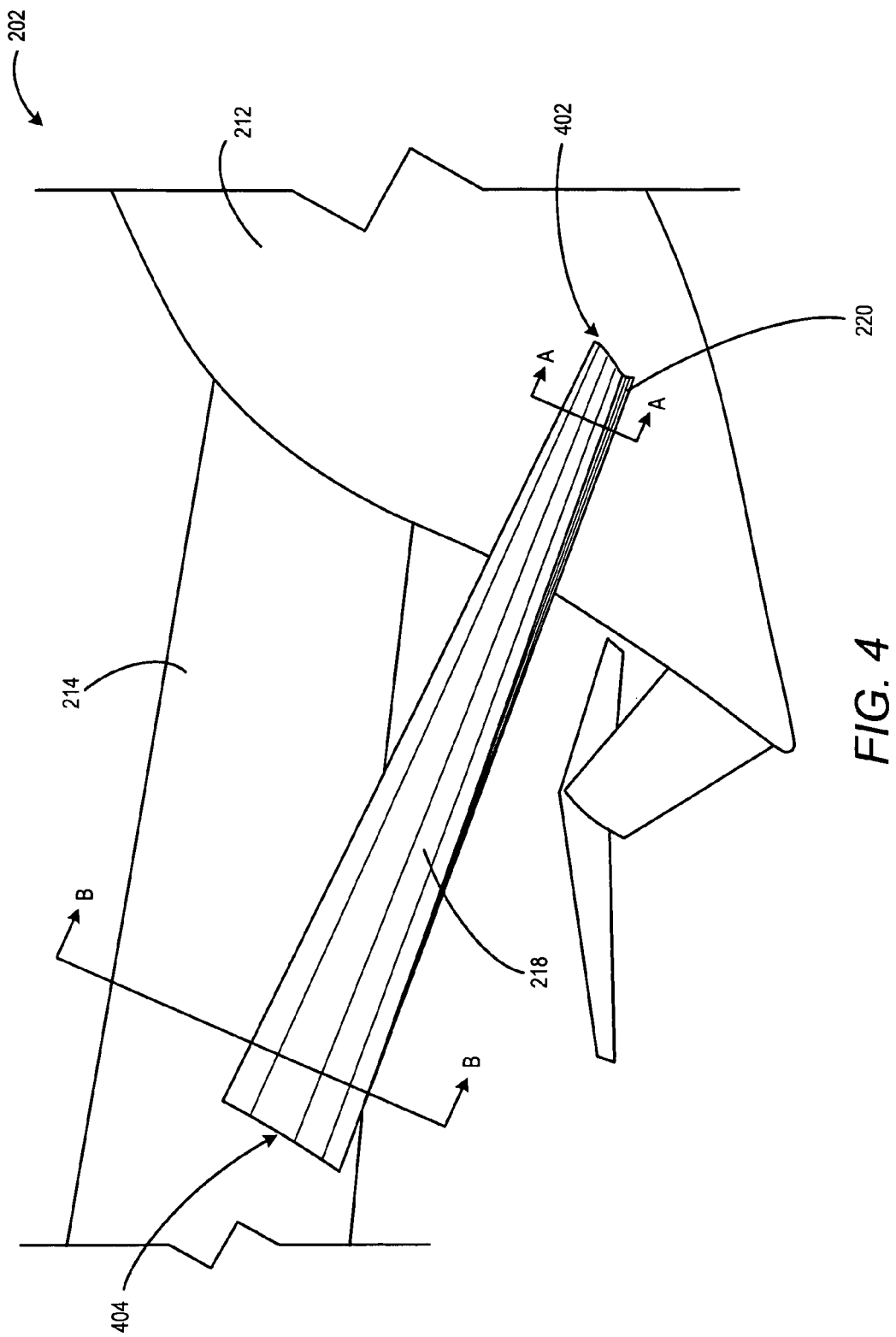
FIG. 4 is a bottom perspective view of a portion of an aircraft showing a wing strut trailing edge device configured in a deployed position according to various embodiments presented herein.
Figure 5:
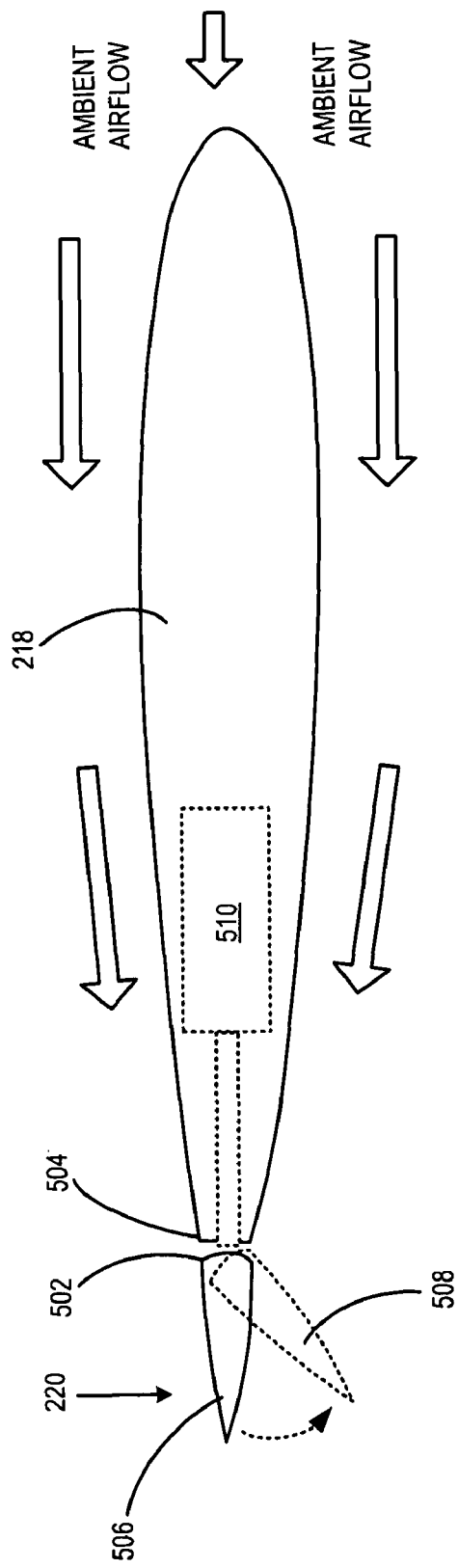
FIG. 5 is a cross-sectional view of the wing strut and trailing edge device along line A-A as shown in FIG. 4 according to various embodiments presented herein.
Figure 6:
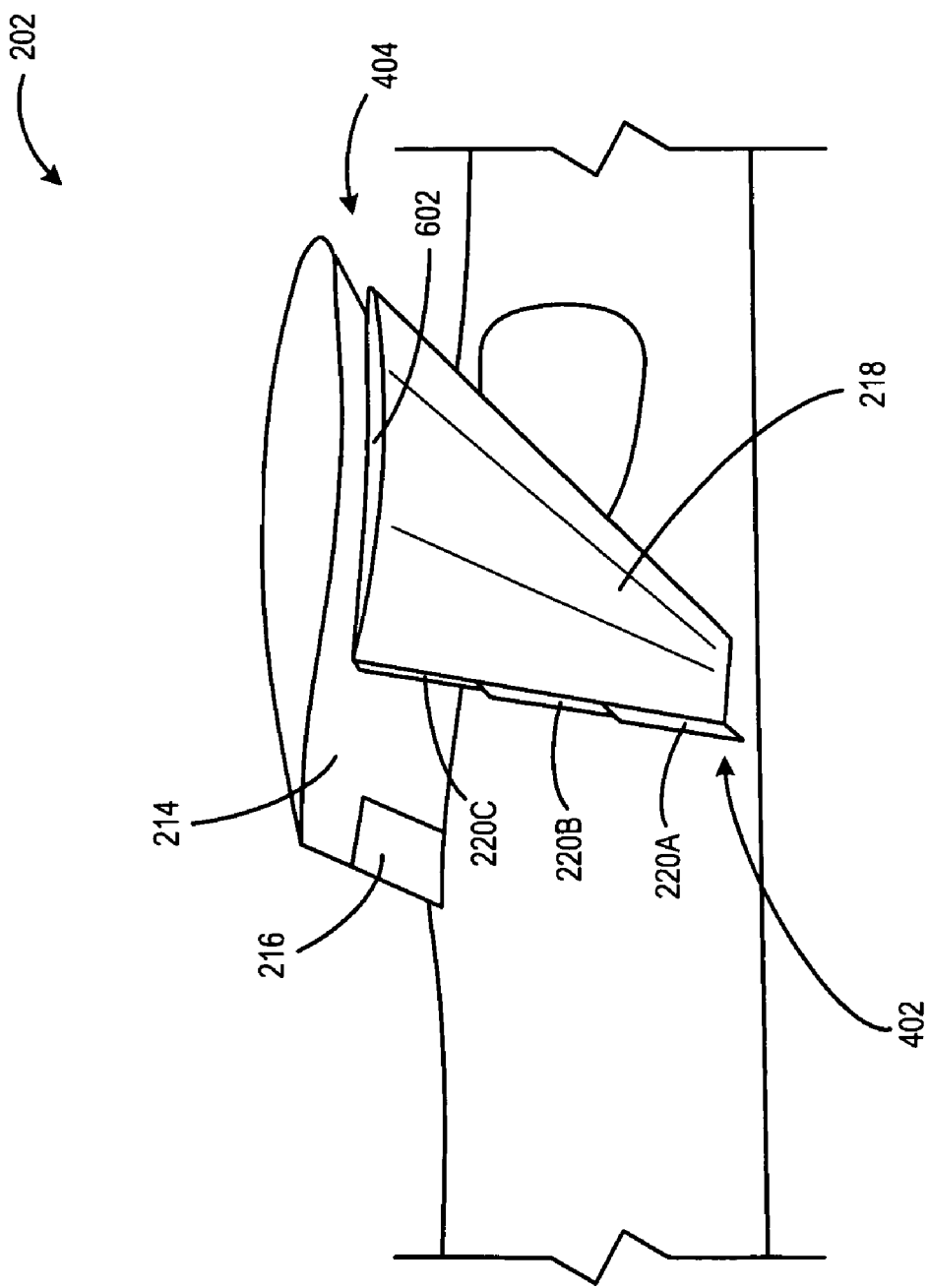
FIG. 6 is a cross-sectional view of the wing strut and wing along line B-B as shown in FIG. 4 according to various embodiments presented herein.

Turning now to FIGS. 4-6, one embodiment of a wing strut 218 with a trailing edge device 220 will be described. FIG. 4 shows a bottom perspective view of a wing strut 218 on one side of the aircraft 202. A duplicate wing strut 218 and corresponding trailing edge device 220 are attached to an opposite side of the aircraft 202 and configured as a mirror image to the wing strut 218 and trailing edge device 220 shown in FIG. 4. According to the embodiment shown, the wing strut 218 includes a fuselage attachment end 402 that is attached to a lower portion of the fuselage 212 and a wing attachment end 404 that is attached to a lower side of the wing 214. The precise locations of attachment are dependent upon the specific application and may be determined by those with skill in the art.

FIG. 4 shows the trailing edge device 220 in a deployed configuration. According to this embodiment, the trailing edge device 220 tapers such that the width, or chord length from a leading edge of the device 220 closest to the strut to a trailing edge of the device 220, is maximized at a position proximate to the fuselage attachment end 402 of the wing strut 218 and decreases to a minimum width at a position at or near the wing attachment end 404 of the wing strut 218. One advantage to tapering the trailing edge device 220 such that the inboard chord length is longer than the outboard chord length is to minimize or negate the effect of the airflow around the wing strut 218 on the wing 214. For this same reason, as will be described in greater detail below with respect to FIG. 6, the wing strut 218 may be shaped to minimize the ambient airflow disruption around the wing 214 resulting from the proximity of the wing strut 218 to the wing 214 near the wing attachment end 404.

The tapering of the trailing edge device 220 may be created in any number of ways. For example, as shown in FIG. 4, the trailing edge device 220 may be created as a one-piece apparatus that uniformly, or non-uniformly, tapers from one end to the other. Alternatively, as shown in FIG. 6, the trailing edge device 220 may include any number of separate adjacent sections (i.e., trailing edge device sections 220A, 220B, and 220C), with consecutive adjacent sections each having a smaller chord length than the previous section when moving from inboard to outboard sections. It should be understood, however, that the present disclosure is not limited to a trailing edge device 220 that tapers. According to alternative embodiments, the trailing edge device 220 may have a uniform chord length across the entire length of the apparatus, whether a one-piece apparatus or a trailing edge device 220 that includes separate adjacent sections.

FIG. 5 shows a cross-section of the wing strut 218 and corresponding trailing edge device 220 along line A-A shown in FIG. 4. As seen in FIG. 5, the trailing edge device 220 is attached to the wing strut 218 so that a leading edge 502 of the trailing edge device 220 is hinged to a trailing edge 504 of the wing strut 218. The trailing edge device 220 is attached to at least one actuator 510 mounted within the wing strut 218. The actuator 510 is operative to rotate the trailing edge device 220 from a stowed configuration 506 downward into the ambient airflow to a deployed configuration 508. Rotating the trailing edge device 220 downward to the deployed configuration 508 increases the pressure differential between the lower air pressure on the top surface of the strut and trailing edge device 220 and the higher air pressure on the bottom surface of the strut and trailing edge device 220 to create aerodynamic lift.

It should be understood that the actuator 510 may utilize hydraulic, electric, pneumatic, or any other known technology for mechanically moving the trailing edge device 220 between positions. The actuator 510 may be configured to deploy the trailing edge device 220 fluidly from the stowed configuration 506 to the deployed configuration 508, or may deploy the trailing edge device 220 in any number of pre-programmed degree increments from the stowed configuration 506 to the deployed configuration 508. For example, the trailing edge device 220 may only have two positions, 0 degrees of deflection (stowed configuration 506) or 30 degrees of deflection (deployed configuration 508). Alternatively, the trailing edge device 220 may have pre-programmed stops at 0 degrees, 10 degrees, 20 degrees, 30 degrees, and so on.

While a single actuator 510 is shown in FIG. 5 to be mounted within the wing strut 218, it should be appreciated that any number of actuators 510 may be utilized and may be mounted in any location within the aircraft fuselage 212 and/or the wing strut 218. For example, when the trailing edge device 220 includes a number of separate adjacent sections, a separate actuator 510 may be attached to each section. In doing so, the actuators 510 may operate in unison to deploy each section simultaneously or may be controlled independently to separately deploy each section as needed. In the latter embodiment, if flight conditions dictate that maximum lift be created, such as during take-off, then all sections of the trailing edge device 220 could be deployed together to a maximum deflection angle. However, during other flight operations, such as when the aircraft 202 slows for landing, segments of the trailing edge device 220 may be sequentially deployed as airspeed decreases to smooth the transition from cruise operations to landing operations.

The cross-sectional shape of the wing strut 218 and attached trailing edge device 220 as shown in FIG. 5 includes a substantially symmetrical airfoil having little to no camber at the fuselage attachment end 402. According to various embodiments, the camber of the wing strut 218 changes from the substantially uncambered airfoil at the fuselage attachment end 402 to an under-cambered, or negatively cambered, airfoil at the wing attachment end 404, as shown in FIG. 6. FIG. 6 shows a cross-section of the wing strut 218 and wing 214 along line B-B of FIG. 4. The under-cambered airfoil 602 can be seen at the location close to the wing attachment end 404 where the wing strut 218 intersects the wing 214.

Similar to the benefit created by tapering the trailing edge device 220 as described above, a reason for changing the camber of the wing strut 218 from the fuselage attachment end 402 to the wing attachment end 404 is to optimize the lift created by the wing strut 218 and trailing edge device 220 while minimizing the drag of the wing strut 218 and trailing edge device 220 on the airflow around the wing 214. Consequently, because of the spacing between the wing strut 218 and the wing 214 at the fuselage 212, the wing strut 218 can have a symmetrical airfoil shape, or even a positive camber, to increase the lift creation when the trailing edge device 220 is deployed. However, at the location where the wing strut 218 approaches and connects to the wing 214, the airflow around the wing strut 218 may affect the airflow around the wing 214. The under-cambered airfoil 602 is shaped to minimize any decrease in air pressure on the lower side of the wing 214, which would negatively impact the lift and drag created by the wing 214 at that location.

It should be understood that the present disclosure is not limited to a wing strut 218 and trailing edge device 220 combination apparatus that changes camber along the length of the apparatus. According to one embodiment, the trailing edge device 220 is attached to a wing strut 218 having a constant camber from the fuselage attachment end 402 to the wing attachment end 404. In all embodiments, the particular airfoil shape along any length of the wing strut 218 and trailing edge device 220 may be determined according to the design criteria of the aircraft 202 and targeted mission specifications.

Moreover, it should be appreciated that the wing strut 218 may be configured with any length, width, depth, internal structure, materials, and cross-sectional shape without departing from the scope of this disclosure. Similarly, the trailing edge device 220 may be configured within the scope of this disclosure such that it extends along the trailing edge of any length of the wing strut 218, and may be configured to have any length, width, depth, internal structure, materials, and cross-sectional shape.

As discussed above, the trailing edge devices 220 may be deployed during various types of flight operations, or flight events, to increase the amount of lift generated by the aircraft 202 and to provide further control capabilities to the aircraft 202. The operation of the trailing edge devices 220 may be manual such that a pilot operates a switch or other control in the cockpit to selectively deploy and retract the trailing edge devices 220. According to an alternative embodiment, the trailing edge devices 220 are operatively linked to the aircraft flaps 216 such that the trailing edge devices 220 deploy in concert with the flaps 216. For example, during landing operations, the pilot or flight computing system 228 deploys the flaps 216 a desired amount at appropriate times in the landing sequence. When the flap controls are activated to deploy the flaps 216, the trailing edge devices 220 are deployed simultaneously with the flaps 216. Similarly, when the flaps 216 are raised, the trailing edge devices 220 are retracted to the stowed position 506 simultaneously with the flaps 216.

According to yet another embodiment, the trailing edge devices 220 may be controlled independently by the flight computing system 228 to deploy and retract according to changes in current flight operations data collected by any number and type of aircraft sensors. For example, the flight computing system 228 may be pre-programmed to monitor various flight operations criteria such as airspeed, attitude, angle of attack, flight controls, landing gear actuation, pilot commanded input, and any other quantity and type of flight parameters to determine when additional lift on one or both sides of the aircraft would be beneficial to current flight operations.

When any of these monitored flight parameters, or combination of parameters, exceed one or more predetermined threshold values, the flight computing system 228 may operate, or instruct the pilot to operate, one or more of the trailing edge devices 220 to modify the lift created by the wing struts 218. It should be appreciated that while the trailing edge devices 220 may be deployed on each side of the aircraft 202 simultaneously to symmetrically generate lift, the trailing edge devices 220, or sections of the trailing edge devices 220, may also be deployed independently to create lift on only one side of the aircraft 202 to assist in aircraft roll control if desired.

Figure 7:
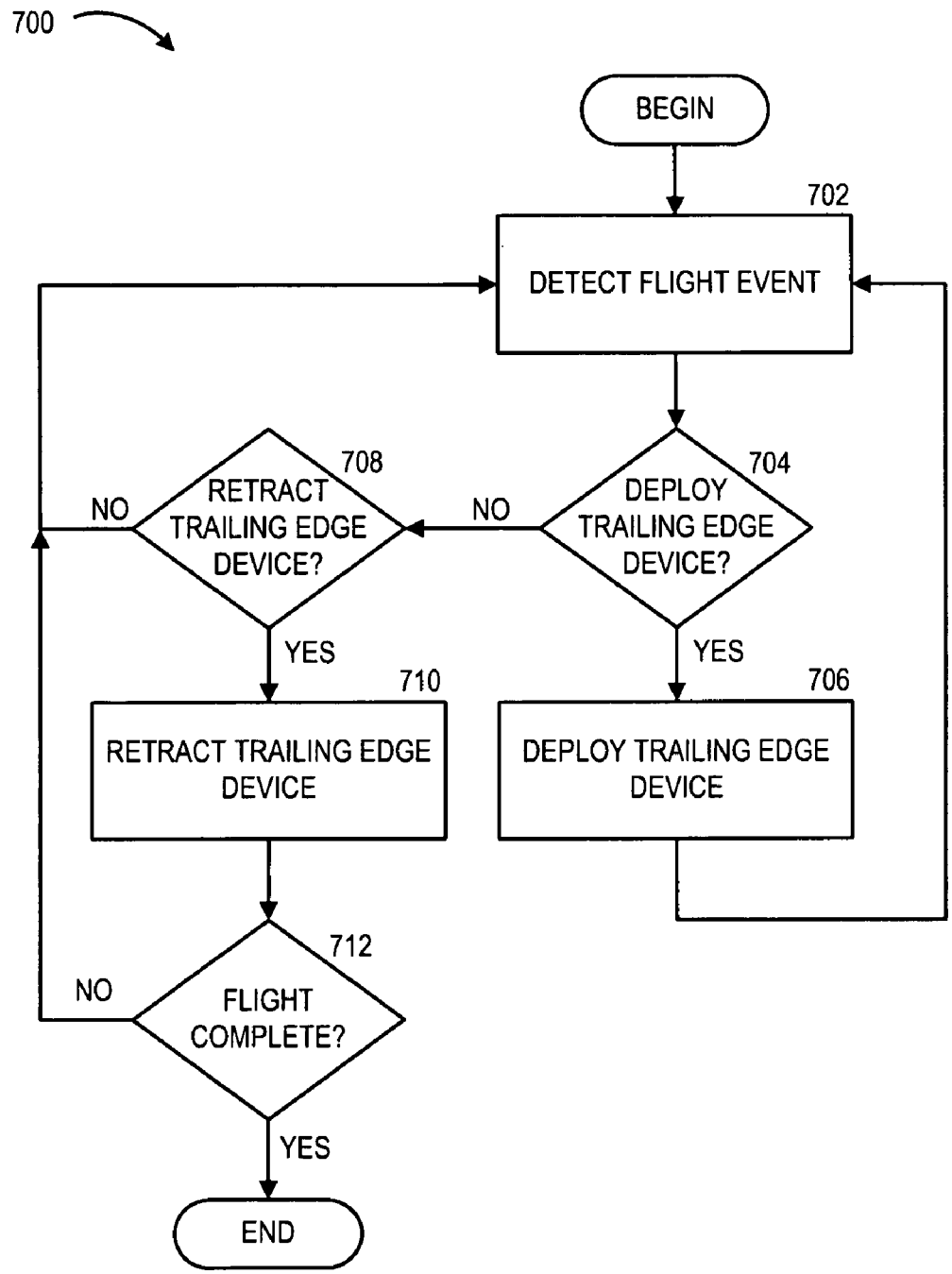
FIG. 7 is a flow diagram showing a method of creating aerodynamic lift with a wing strut according to various embodiments presented herein.

Turning now to FIG. 7, an illustrative routine 700 for creating aerodynamic lift with a wing strut 218 will now be described in detail. It should be understood that these operations may be performed under various embodiments by a pilot, the flight computing system 228, or a combination thereof. According to embodiments in which one or more flight parameters, such as airspeed, aircraft attitude, and/or angle of attack for example, are used to dynamically manipulate the trailing edge devices 220 to control the aircraft 202, the flight computing system 228 performs the routine 700 described below. In doing so, the flight computing system 228 may retrieve any quantity of data from aircraft sensors, and then aggregate and transform the data into electrical control signals for controlling the actuator 510 output. These operations are carried out by the flight computing system 228 according to computer-implemented instructions stored within a computer storage device of the flight computing system 228.

It should be appreciated that more or fewer operations may be performed than shown in the figures and described herein. These operations may also be performed in a different order than those described herein. The routine 700 begins at operation 702, where a flight event is detected. As described above, a flight event can be any type of operation or occurrence in which supplemental lift generation or reduction is a desirable result. Examples include, but are not limited to, the detection of a cockpit switch being activated to deploy or retract the trailing edge devices 220, the activation of a flap operation switch for extending or retracting the wing flaps 216, or one or more flight operations criterion thresholds being exceeded.

When the flight event is detected, the routine 700 continues to operation 704, where a determination is made as to whether one or more of the trailing edge devices 220 should be deployed. As discussed above, the trailing edge devices 220 may be deployed if the flight computing system 228 detects the activation of an appropriate switch or determines according to current flight parameters and criteria stored within computer-implemented instructions that supplemental lift generation using one or more trailing edge device 220 is appropriate. As an illustrative example, if the flight event includes the wing flaps 216 being deployed twenty degrees and the trailing edge devices 220 are synchronized to the wing flaps 216, then the flight computing system 228 will deploy the trailing edge devices 220 twenty degrees in accordance with the flap 216 deployment. If the flight event does not correspond with a deployment of the trailing edge devices 220, then the routine proceeds to operation 708 and continues as described below.

However, if deployment is appropriate at operation 704 given the detected flight event, then the routine 700 continues to operation 706 and the corresponding trailing edge devices 220 are deployed. From operation 706, the routine 700 continues to operation 708, where a determination is made as to whether one or more of the trailing edge devices 220 should be retracted in light of the detected flight event. Similar to the deployment determination at operation 704, the flight computing system 228 determines at operation 708 that trailing edge devices 220 are to be retracted if the flight computing system 228 detects the activation of an appropriate switch or determines according to current flight conditions and criteria stored within computer-implemented instructions that supplemental lift reduction using one or more trailing edge device 220 is appropriate.

If the flight event does not correspond with the retraction of the trailing edge devices 220, then the routine returns to operation 702 and monitors current flight conditions until detecting another flight event that will trigger the deployment or retraction of the trailing edge devices 220. As a non-limiting example of this embodiment, the flight event originally detected at operation 702 may have satisfied a particular threshold criterion to be detected as a flight event, such as an incremental deployment of the wing flaps 216, but does not satisfy the appropriate criteria for triggering a deployment or retraction of the trailing edge devices 220, such as flight at a threshold airspeed.

Returning to operation 708, if retraction of the trailing edge devices 220 is appropriate given the detected flight event, then the routine 700 continues to operation 710 and the corresponding trailing edge devices 220 are retracted. As an illustrative example, the determination at operation 708 that the trailing edge devices 220 are to be retracted may be based on a flight event corresponding to an activation of a cockpit switch or corresponding to the detection of an airspeed increase above a pre-determined threshold, both of which would satisfy the retraction criteria at operation 708 and lead to a retraction of the trailing edge devices 220 at operation 710.

From operation 710, the routine 700 continues to operation 712, where a determination is made as to whether the flight has terminated. This determination may be made from any number of factors, including but not limited to a powering off of one or more of the aircraft systems 206. If the flight is complete, then the routine 700 ends. If the flight is not complete, then the routine 700 returns to operation 702 and continues as described above when the next flight event is detected.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A wing strut, comprising:
   a trailing edge;
   a wing attachment end configured for attachment to a lower side of a wing;
   a fuselage attachment end opposite the wing attachment end and configured for attachment to a fuselage; and
   a trailing edge device rotatably connected to the trailing edge,
      wherein the trailing edge device is configured to rotate downward into an ambient airflow to a deployed configuration to increase aerodynamic lift,
      wherein the trailing edge device is configured to rotate upward from the deployed configuration to a stowed configuration to reduce the aerodynamic lift,
      wherein the trailing edge device comprises an inboard chord length at a location proximate the fuselage attachment end of the wing strut and an outboard chord length at a location proximate the wing attachment end of the wing strut that is shorter than the inboard chord length.

2. The wing strut of claim 1, wherein the wing strut is configured such that a cross-section of the wing strut and trailing edge device in the stowed configuration is shaped as an airfoil.

3. The wing strut of claim 2, wherein the airfoil comprises a negative camber at a position proximate the wing attachment end.

4. The wing strut of claim 3, wherein the airfoil comprises a substantially uncambered airfoil shape proximate the fuselage attachment end and wherein the wing strut transitions along a length of the wing strut to the negative camber at the position proximate the wing attachment end.

5. The wing strut of claim 1, wherein a chord length of the trailing edge device tapers uniformly along a length of the trailing edge device from the inboard chord length to the outboard chord length.

6. The wing strut of claim 1, wherein the trailing edge device comprises a plurality of sections, wherein the plurality of sections comprises a plurality of chord lengths.

7. An aircraft, comprising:
   a fuselage;
   a wing attached to a top portion of the fuselage;
   a wing strut, comprising
      a fuselage attachment end attached to a lower portion of the fuselage,
      a wing attachment end opposite the fuselage attachment end and attached to a lower side of the wing, and
      a trailing edge device configured to deploy downward into an ambient airflow to create a deployed configuration and to retract upward from the deployed configuration to a stowed configuration; and
   a flight computing system operative
      to monitor a plurality of flight parameters,
      to determine according to one or more flight parameters that a threshold value associated with the one or more flight parameters has been exceeded, and in response to determining that the threshold value associated with the one or more flight parameters has been exceeded, to deploy the trailing edge device from the stowed configuration to the deployed configuration.

8. The aircraft of claim 7, wherein the wing strut is configured such that a cross-section of the wing strut and trailing edge device in the stowed configuration is shaped as a substantially uncambered airfoil at a position proximate the fuselage attachment end, and wherein the wing strut transitions along a length of the wing strut to a negative cambered airfoil at a position proximate the wing attachment end.

9. The aircraft of claim 7, wherein the trailing edge device comprises an inboard chord length at a location proximate the fuselage attachment end of the wing strut and an outboard chord length at a location proximate the wing attachment end of the wing strut, and wherein the outboard chord length is shorter than the inboard chord length.

10. The wing strut of claim 9, wherein a chord length of the trailing edge device tapers uniformly along a length of the trailing edge device from the inboard chord length to the outboard chord length.

11. The wing strut of claim 9, wherein the trailing edge device comprises a plurality of sections, wherein the plurality of sections comprises a plurality of chord lengths.

12. A method for creating aerodynamic lift with a wing strut, the method comprising:
    receiving flight operations data at an aircraft flight computing system, the flight operations data received from at least one aircraft sensor;
    determining from the flight operations data that one or more flight parameters have exceeded a predetermined threshold value;
    in response to determining that one or more flight parameters have exceeded the predetermined threshold value, determining that a flight event has occurred; and
    in response to determining that the flight event has occurred, deploying a trailing edge device attached to a trailing edge of the wing strut such that the trailing edge device rotates downward into an ambient airflow to create the aerodynamic lift,
    wherein the wing strut comprises a fuselage attachment end attached to a lower portion of an aircraft fuselage and a wing attachment end opposite the fuselage attachment end and attached to a lower side of an aircraft wing, and
    wherein the trailing edge device is coupled to the trailing edge of the wing strut via an actuator configured to deploy the trailing edge device downward to a deployed configuration and to retract the trailing edge device upward from the deployed configuration to a stowed configuration.

13. The method of claim 12, further comprising:
    attaching the trailing edge device to the trailing edge of the wing strut such that the trailing edge device is rotatable around the trailing edge;
    attaching the wing strut at the wing attachment end to the aircraft wing;
    attaching the wing strut at the fuselage attachment end to the aircraft fuselage; and
    attaching the trailing edge device to the actuator that is configured to rotate the trailing edge device downward to the deployed configuration and to retract the trailing edge device upward from the deployed configuration to the stowed configuration according to input from the aircraft flight computing system.

14. The method of claim 13, further comprising shaping the wing strut and the trailing edge device to have a symmetrical cross-sectional airfoil shape at the fuselage attachment end.

15. The method of claim 13, further comprising shaping the wing strut and the trailing edge device to have a negatively cambered cross-sectional airfoil shape at the wing attachment end.

16. The method of claim 12, further comprising:
    determining at the aircraft flight computing system that a subsequent flight event has occurred; and
    in response to determining that the subsequent flight event has occurred, retracting the trailing edge device such that the trailing edge device rotates upward to the stowed configuration to reduce the aerodynamic lift associated with the wing strut and trailing edge device.

17. The method of claim 12, wherein the flight event comprises an activation of aircraft wing flaps.

* * * * *